3,780,129
DEHYDROGENATION PROCESS
Heinz G. Friedrich, Houston, Tex., assignor to Petro-Tex Chemical Corporation, Houston, Tex.
No Drawing. Filed Apr. 10, 1972, Ser. No. 242,761
Int. Cl. C07c 5/18
U.S. Cl. 260—683.3        13 Claims

ABSTRACT OF THE DISCLOSURE

An improved dehydrogenation process for the production of diolefins by the dehydrogenation of aliphatic hydrocarbons by contacting the hydrocarbon compound with a catalyst containing chromic oxide, alumina, nickel and lithium.

BACKGROUND OF THE INVENTION

Field of the invention

This application relates to the dehydrogenation of aliphatic organic compounds for the production of olefins and diolefins. More particularly, this application relates to improved catalytic compositions useful in the preparation of butadiene and butenes from n-butane, propylene from propane, isobutene from isobutane and isoamylenes and isoprene from isopentane by catalytic dehydrogenation.

Description of the prior art

Organic compounds are commercially dehydrogenated by contacting the compound to be dehydrogenated at an elevated temperature preferably in the presence of catalysts. A particularly useful catalyst which has been widely employed in preparing butadiene and butylenes from n-butane is an alumina-chromia catalyst. The alumina-chromic oxide catalyst is utilized in a commercial process for the one-step dehydrogenation of butane to butadiene and butenes. This process has been reported to produce only about 11 moles percent butadiene per pass. Furthermore, the catalyst becomes coated with coke and after a period of only several minutes, the catalyst must be regenerated by purging the catalyst bed followed by burning off of the carbon.

The use of alkali or alkaline earth promoters to reduce the carbon formation and thereby extend the operating life of the catalyst bed between regeneration periods has been suggested in the prior literature. However, as pointed out in U.S. Pat. 2,956,030 in the case of many known surface active catalysts such as the alumina-chromic oxide type catalysts, the presence of alkali metal compounds is generally undesirable because of their possible adverse effect on activity or selectivity of the catalyst or from the standpoint of their acting as fluxing impurities lowering the temperature of the sintering or fusion of the catalyst. Notwithstanding these problems, the patentees of Pat. 2,956,030 observed that the presence of an alkali metal ion within certain narrow limits could be tolerated in the alumina-chromic oxide catalyst, and that within these limits, the alkali metal ion had a beneficial effect in reducing the rate of coke formation on the catalyst thus extending the operable period between regeneration operations. The optimum range of alkali metal oxides content was reported to be from 0.25 to 0.45 percent.

A catalyst comprising aluminum oxide, chromium sesquioxide and metallic nickel was disclosed in U.S. Pat. 2,203,826 as being useful in the dehydrogenation and cyclization of aliphatic hydrocarbons. The small addition of nickel to the aluminum-chromium catalyst was reported to improve the yield of cyclic compounds from the aliphatic starting materials. For example, the yield of toluene from normal heptane using a catalyst containing nickel was reported to be about 31 percent whereas the aluminum-chromium catalyst not containing the nickel yielded about 24 percent toluene.

SUMMARY OF THE INVENTION

According to the present invention organic, aliphatic compounds are dehydrogenated by an improved process utilizing a catalyst comprising alumina, chromium oxide, lithium and nickel. It has been found, quite unexpectedly, that when a minor amount of lithium and nickel are incorporated into the alumina-chromium oxide catalyst, the resulting catalyst composition demonstrates significant improvements in yield of dehydrogenated products. For example, the prior art dehydrogenation of n-butane to butenes and butadiene using chromia-alumina catalyst is quite satisfactory with respect to selectivity of the products produced, however, conversion usually falls significantly short of the thermodynamically possible equilibrium conversions. The present invention provides a catalyst having an unexpected increase in activity which results in improved and significant increase in yield of the desired dehydrogenation products per pass in comparison to the yields obtained with the conventional chromia-alumina catalysts. For instance, by adding small amounts of nickel and lithium to a commercial chromia-alumina catalyst (Houdry C), yields of butenes and butadiene of about 46 percent per pass were obtained in comparison to yields of about 40 percent per pass for the Houdry C catalyst without the added nickel and lithium.

DESCRIPTION OF THE PREFERRED EMBODIMENTS

According to this invention an improved catalyst and a process utilizing the improved catalyst are provided for the dehydrogenation of aliphatic organic compounds to obtain the corresponding unsaturated derivatives thereof.

The process of this invention may be applied to the dehydrogenation of a variety of organic compounds having at least 2 carbon atoms to obtain the corresponding unsaturated derivative thereof. Such compounds normally will contain from 2 to 20 carbon atoms, at least one

grouping, a boiling point below about 350° C., and such compounds may contain other elements in addition to carbon and hydrogen such as oxygen, halogens, nitrogen and sulphur. Preferred are compounds having from 2 to 12 carbon atoms and especially preferred are compounds of 4 and 5 carbon atoms.

Among the types of organic compounds to be dehydrogenated to the corresponding unsaturated derivative by means of the process of this invention are nitriles, alkyl halides, aldehydes, alcohols, cycloalkanes, alkanes, alkenes, and the like. Illustrative dehydrogenations include propionitrile to acrylonitrile, propionaldehyde to acrolein, ethyl chloride to vinyl chloride, methyl isobutyrate to methyl methacrylate, ethane to ethylene, propane to propylene, isobutane to isobutylene, n-butane to butene and butadiene-1,3, butene to butadiene-1,3, methyl butene to isoprene, cyclopentane to cyclopentene and cyclopentadiene-1,3, and the like.

The preferred feed to be dehydrogenated comprises hydrocarbons of 4 to 5 carbon atoms and particularly n-butane, n-butene-1, n-butene-2, n-pentane, n-pentene-1, n-pentene-2, 2-methylbutane, 2-methylbutene-1, 2-methylbutene-2, 3-methylbutene-1, 2-methylpentane, 2-methylpentene-1 and mixtures thereof. The preferred products are butadiene-1,3 and isoprene.

Diluents or stripping agents such as nitrogen, helium, or other gases may be fed to the process at any point. Mixtures of diluents may be employed. Volatile compounds which are not dehydrogenated or which are dehydrogenated only to a limited extent may also be present as diluents.

The temperature during the dehydrogenation generally will be at least about 450° C., such as within the range of about 500° C. to about 650° C. or 700° C. Preferably the temperatures are within the range of about 500° C. and 600° C. The total pressure during dehydrogenation may be atmospheric, super atmospheric or sub atmospheric. The contact time of the organic compound during dehydrogenation may also vary widely depending upon the particular conditions employed. Determination of the optimum contact time under the particular conditions so chosen from the ranges of conditions mentioned herein is well within the skill of any artisan in this art. The flow rates will be within the range of about 0.1 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The catalyst of the present invention contain activated alumina, chromium oxide, lithium and nickel. A preferred catalyst comprises a minor portion of chromium oxide, lithium oxide, and nickel oxide with a major proportion of activated alumina such as gamma or eta alumina. The catalyst generally will contain as active catalyst components from one to forty percent chromium oxide, 0.01 and 0.1 percent nickel oxide, 0.1 to 10 percent lithium oxide with the remainder being the activated alumina. A particularly preferred catalyst of the present invention contains as active ingredients from 18 to 20 percent chromium oxide, 0.04 to 0.075 percent nickel oxide, 0.5 to 2.5 weight percent lithium oxide with the remainder being gamma or etal alumina. The above percentages are based on the weight of active components in the catalyst, i.e., percent by weight of total chromium compounds, lithium compounds, nickel compounds and activated alumina. Carriers or supports for the active catalyst components may be employed such as pumice, silica, alpha alumina, etc. In addition, inert granular material of high heat capacity may be mixed with the active catalyst components in predetermined amounts to obtain any desired heat capacity of the complete catalyst bed. The selection of such an inert granular material and the ratio of granular inert material to the active catalyst components are well within the skill of an artisan in the catalytic dehydrogenation art. Generally, up to 50 percent by weight of inert granular material based on the total weight of the combined catalyst is satisfactory.

The catalyst compositions of the present invention contain the essential ingredients of activated alumina, chromic oxide, lithium and nickel. These essential ingredients can be made by mixing the separate ingredients by any of the methods known to those skilled in the art. For example, the alumina may be treated with a salt of chromium and the resulting mixture heated to decompose the salt and deposit chromium oxide on the alumina. Nickel nitrate and lithium nitrate may be added to the alumina-chromia component and the resulting mixture pelleted and dried, if necessary. A simple manner of preparing the catalyst of the present invention is to take commercially available chromia-alumina catalysts such as that available under the trade name of Houdry C and adding the lithium nitrate and nickel nitrate thereto. The mixture is then pelleted and dried if necessary.

The alumina may be any of the known forms of alumina, although preferably it is an activated alumina such as gamma and eta alumina, so that a chromium oxide layer is readily deposited thereon. The alumina-chromia dehydrogenation catalyst can also be prepared by alumina with a solution of chromic acid and after drying, heating the treated activated alumina at temperatures of about 600° C. Examples of the preparation of such catalyst materials are found in U.S. Pats. 2,399,678 and 2,419,997, the entire contents of which are incorporated herein by reference.

The following example illustrates a specific embodiment of the present invention and details one particular embodiment in the practice of the invention. Percent conversion refers to the moles of organic compound to be dehydrogenated, that is, the number of moles of organic compound consumed, based on the moles of the organic compound being fed to the reactor. Percent selectivity refers to the moles of product formed based on the moles of organic compound consumed. Percent yield refers to the product formed based on the moles of organic compound fed to the reactor. All other percentages are by weight unless expressed otherwise.

EXAMPLE 1

The invention is illustrated by the dehydrogenation of n-butane to butenes and butadiene. The n-butane was passed through a catalyst bed comprising a standard alumina-chromia catalyst obtained commercially under the trade name Houdry C, nickel oxide, lithium oxide and inert alpha-$Al_2O_3$. The catalyst composition was prepared by mixing the commercially available alumina-chromia catalyst material (Houdry C) with nickel nitrate, lithium nitrate and the inert alpha-$Al_2O_3$. The mixed catalyst was extruded into pellets of about ⅛" in size and the pellets were then dried in an oven at less than 300° F. The catalyst could be calcined to convert the nickel nitrate and lithium nitrate to their respective oxides, however, this is not necessary as such conversion is accomplished under the temperatures used in the dehydrogenation reaction itself. The catalyst prepared in the present example contained approximately 40 percent of the inert alpha-$Al_2O_3$, 0.05 percent nickel (based on the oxide), 1.0 percent lithium (based on the oxide) with the remainder being essentially the commercial alumina-chromia catalyst (Houdry C).

The n-butane gas consisting of 99.6 mol percent n-butane, 0.2 mol percent isobutane and 0.2 percent butenes was passed through the catalyst bed at a temperature of approximately 550° C. and at a space velocity of 1.3 LHSV. The reactor was then purged with nitrogen, regenerated by passing an air stream through the catalyst bed, purged with nitrogen, reduced with hydrogen and the cycle repeated. The total time for such a cycle is as follows:

9 minutes feed of n-butane to the catalyst bed,
1 minute nitrogen purge of the catalyst bed,
9 minutes feed of air to the catalyst bed,
1 minute purge of the catalyst bed with nitrogen and
1 minute feed of hydrogen to the catalyst bed to reduce any lithium and nickel or alumina and chromium to their oxides.

The results obtained from the cyclic operation after 162 hours of operation are shown in Table I.

TABLE I

| Catayst | Conversion of n-butane to butenes and butadiene | Selectivity of— | | Yield of— | |
| --- | --- | --- | --- | --- | --- |
| | | Butene-1 and butene-2 | Butadiene | Butene-1 and butene-2 | Butadiene |
| Houdry C plus nickel oxide and lithium oxide, mole percent. | 48.7 | 87.7 | 7.9 | 42.7 | 3.8 |

TABLE II

| Catalyst | Conversion of n-butane to butenes and butadiene | Selectivity of— | | Yield of— | |
| --- | --- | --- | --- | --- | --- |
| | | Butene-1 and butene-2 | Butadiene | Butene-1 and butene-2 | Butadiene |
| Houdry C | 42.4 | 86.7 | 8.9 | 36.8 | 3.8 |

EXAMPLE 2

The dehydrogenation process of Example 1 was repeated with the sole exception that the catalyst consisted entirely of the commercially obtained chromia-alumina catalyst (Houdry C). The results obtained in this example are shown in Table II.

From a comparison of the results shown in Table I and Table II it can be seen that the process of the present invention produces an unexpected and sizable increase of conversion of n-butane to butenes and butadiene in comparison to the process of the prior art as shown in Example 2. Specifically the conversion of n-butane of Example 1 is increased some 7 mol percent with respect to the results shown in Example 2. In addition, the process of the present invention is shown to produce an unexpected and sizable increase in yield of butene and butadiene in comparison to the process of the prior art as shown in Example 2. Specifically, the yield of butene and butadiene of Example 1 is some 6 mol percent greater than in Example 2.

I claim:

1. A process for the catalytic dehydrogenation of hydrocarbon compounds having from 2 to 12 carbon atoms and at least one

grouping which comprises contacting said hydrocarbon compound in a dehydrogenation step at a temperature of from about 450° C. to about 700° C. with a catalyst which comprises an intimate mixture of active catalyst components consisting essentially of from 1 percent to 40 percent by weight chromium oxide, 0.01 percent to 0.1 percent by weight nickel oxide, 0.1 percent to 10 percent by weight lithium oxide with the remainder being essentially alumina.

2. A process according to claim 1 wherein the alumina is selected from the group consisting of gamma alumina, eta alumina or a mixture thereof.

3. A process according to claim 1 wherein the hydrocarbon compound has between 2 and 12 carbon atoms.

4. A process according to claim 1 wherein the hydrocarbon compound has 4 or 5 carbon atoms.

5. A process according to claim 1 wherein the hydrocarbon compound is essentially n-butane.

6. A process according to claim 1 wherein the temperature is between 500° C. and 600° C. and the active catalyst consists of from 18 percent to 20 percent by weight chromium oxide, 0.04 percent to 0.075 percent by weight nickel oxide, 0.5 percent to 2.5 percent by weight lithium oxide with the remainder being essentially alumina.

7. A process according to claim 6 wherein the alumina is gamma alumina, eta alumina or a mixture thereof.

8. A process according to claim 7 wherein the catalyst comprises up to 50 percent by weight of inert, inactive compounds.

9. A process according to claim 6 wherein the organic compound has 4 to 5 carbon atoms.

10. A process according to claim 6 wherein the organic compound is essentially n-butane.

11. The process according to claim 1 wherein the process is cyclic with alternate cycles of dehydrogenation and regeneration by oxidation.

12. The process according to claim 1 wherein the process is operated in the absence of added steam as a diluent.

13. The process of claim 1 wherein the said organic compound is an aliphatic hydrocarbon.

References Cited

UNITED STATES PATENTS

| | | | |
| --- | --- | --- | --- |
| 2,419,997 | 5/1949 | Houdry | 260—683.3 |
| 2,956,030 | 10/1960 | Cornelius et al. | 252—455 R |
| 2,422,172 | 6/1947 | Smith et al. | 260—683.3 |
| 2,474,440 | 6/1949 | Smith et al. | 260—683.3 |
| 2,203,826 | 6/1940 | Komarewsky | 260—673.5 |
| 2,408,131 | 9/1946 | Voorhies | 260—683.3 |
| 2,470,092 | 5/1949 | Corson et al. | 260—683.3 |

DELBERT E. GANTZ, Primary Examiner

V. O'KEEFE, Assistant Examiner

U.S. Cl. X.R.

252—455 R; 260—680